No. 844,699. PATENTED FEB. 19, 1907.
E. W. SWEIGARD.
ATTACHMENT FOR TYPE WRITERS.
APPLICATION FILED OCT. 7, 1905.

3 SHEETS—SHEET 1.

Witnesses:

Inventor:
Emanuel W. Sweigard,
by Bitner, Wiles & Shurvey
Attys.

No. 844,699. PATENTED FEB. 19, 1907.
E. W. SWEIGARD.
ATTACHMENT FOR TYPE WRITERS.
APPLICATION FILED OCT. 7, 1905.
3 SHEETS—SHEET 2.
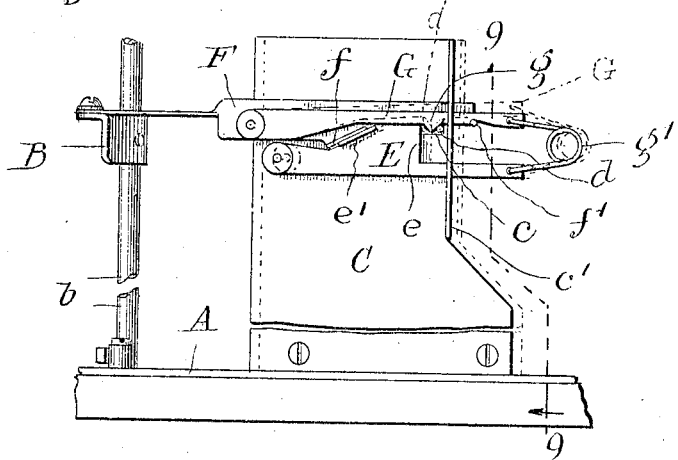
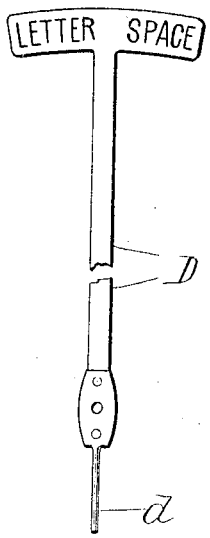
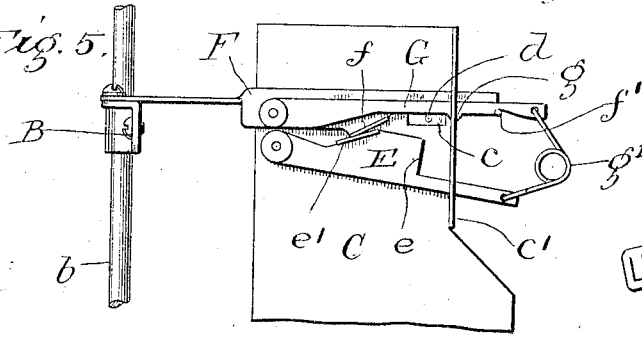
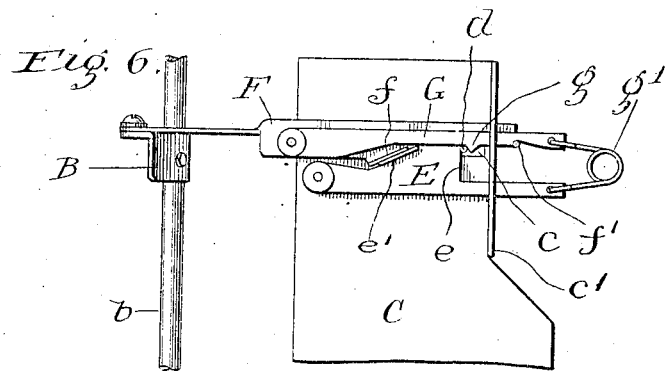
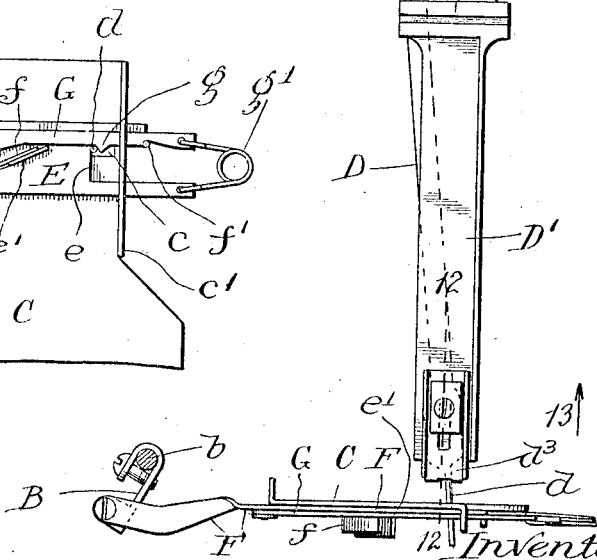
Witnesses:
A. M. Cornwall
J. E. Shervey
Inventor:
Emanuel W. Sweigard
by Bitner, Wiles & Shervey
Attys No. 844,699. PATENTED FEB. 19, 1907.
E. W. SWEIGARD.
ATTACHMENT FOR TYPE WRITERS.
APPLICATION FILED OCT. 7, 1905.
3 SHEETS—SHEET 3.
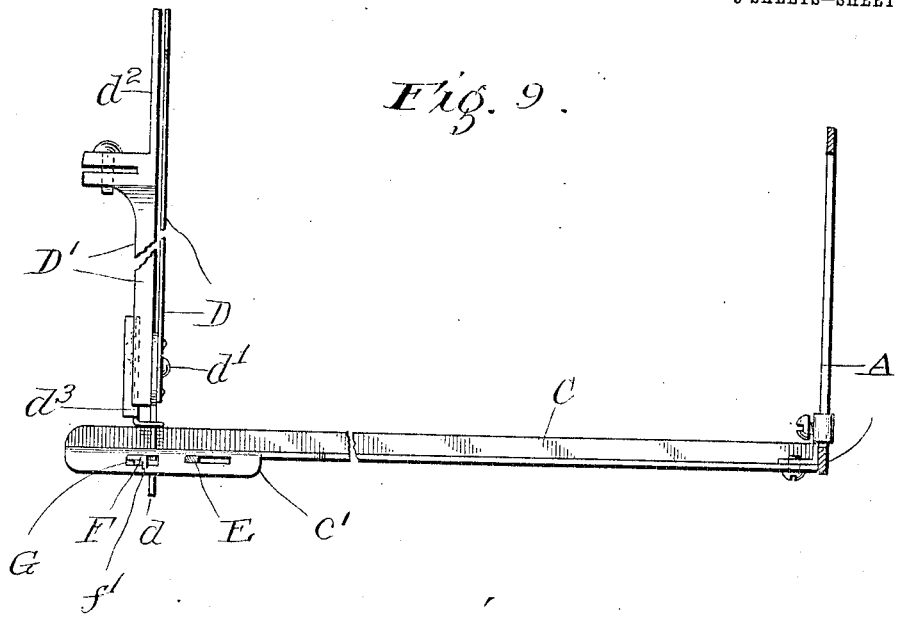
Fig. 9.
Fig. 10.
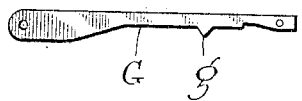
Fig. 11.
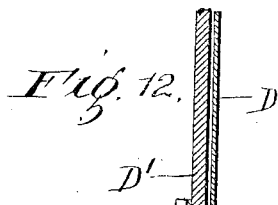
Fig. 12.
Fig. 13.
Witnesses:
K. M. Cornwall
J. E. Sherres
Inventor:
Emanuel W. Sweigard
by Ritter Niles & Shirvey
Attys.

UNITED STATES PATENT OFFICE.

EMANUEL W. SWEIGARD, OF CHICAGO, ILLINOIS.

ATTACHMENT FOR TYPE-WRITERS.

No. 844,699.        Specification of Letters Patent.        Patented Feb. 19, 1907.

Application filed October 7, 1905. Serial No. 281,719.

*To all whom it may concern:*

Be it known that I, EMANUEL W. SWEIGARD, a citizen of the United States of America, residing at Chicago, in the county of Cook and State of Illinois, have invented certain new and useful Improvements in Attachments for Type-Writers, of which the following is a specification.

My invention relates to improvements in attachment for type-writers and is fully described and explained in this specification and shown in the accompanying drawings, in which—

Figure 1:
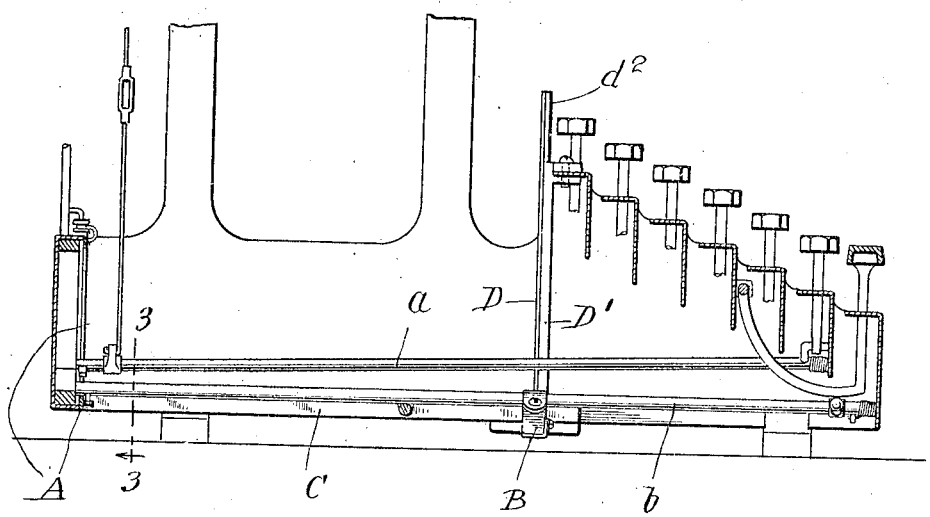
Figure 2:
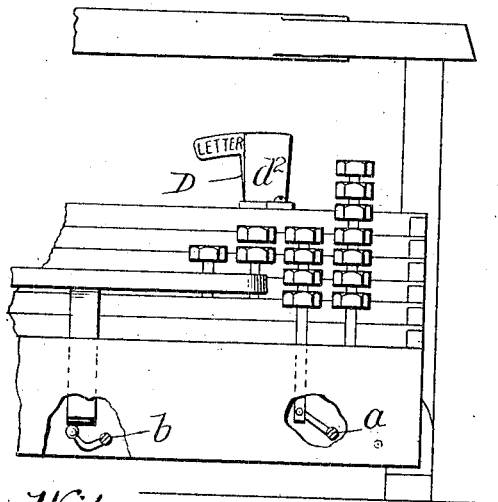
Figure 3:
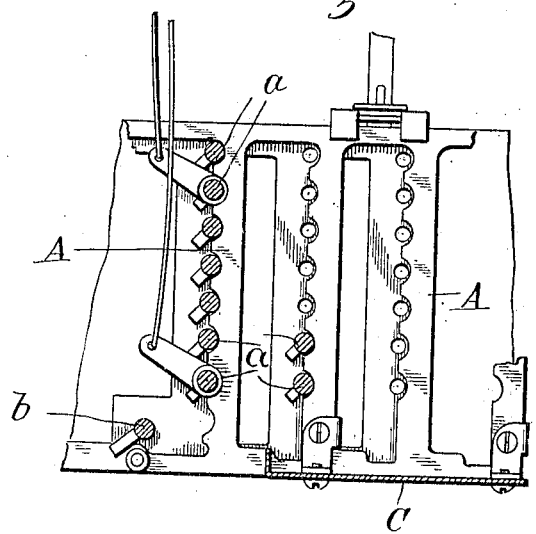

Figure 1 is a vertical longitudinal section through a portion of a type-writer embodying my improved device. Fig. 2 is a front elevation of a portion of a type-writer embodying my device. Fig. 3 is a vertical transverse section in the line 3 3 of Fig. 1. Figs. 4, 5, and 6 are under plans of the operating mechanism of my improvement in three different positions. Fig. 7 is an elevation of the target. Fig. 8 is a front elevation of the attachment removed from place. Fig. 9 is a section in the line 9 9 of Fig. 4 looking in the direction of the arrow. Fig. 10 is an under plan of one of the operating members. Fig. 11 is a similar view of another of the operating members. Fig. 12 is a section in the line 12 12 of Fig. 8, and Fig. 13 is an end view of the target and its supporting-bracket looking in the direction of the arrow 13 in Fig. 8.

In the use of the ordinary under writing type-writer, where the characters as they are printed are invisible to the operator, a large number of errors arise from the operator's forgetting after an interruption whether a space has been made at the end of a word or not. When interrupted for any reason, an operator will usually finish the word. If then the operator forgets whether a space has been made or not and does not look at the writing to make certain, either no space is made at all or two spaces are made. In this way a large number of errors occur. Furthermore, if the operator is careful to note each time an interruption occurs whether a space has been made or not a great amount of time is wasted.

The object of my invention is to provide an indicating means which will show whether a space or a letter was last struck. Such mechanism embodying my invention can be readily applied to type-writers of any make, and the device is here shown as applied to a type-writer of the Smith-Premier type. In this kind of machine, each of the letter-keys rotates a rock-shaft, said shafts being indicated by $a$ in the drawings, and the space-key rotates a space rock-shaft $b$. Each of these rock-shafts is provided at its rear end with a projecting lug which strikes an escapement-operating plate A, Fig. 3, which controls the movement of the carriage. It will be readily understood from Fig. 3 that whenever a character or space key is struck the plate A will move to the right and back, permitting the carriage to move one space. Secured to the escapement-operating plate A is a flat plate C, Figs. 4, 5, and 6. This escapement-operating plate lies horizontally underneath the machine and is shifted horizontally with the escapement-operating plate, the movement being first to the right of the machine, as viewed in Fig. 2, and then back as the keys are released. The two extreme positions of this plate are illustrated by solid and dotted lines in Fig. 4. The plate C is slotted at $c$ to receive the lower end $d$ of a target D, having at its upper end a cross-bar bearing the words "Letter" and "Space," the words being on opposite sides of the cross-bar, as illustrated in Fig. 7. This target is pivoted at $d'$ to a bracket D', secured to the frame of the type-writer, and extends up behind the cover-plate $d^2$. A forked stop $d^3$ is adjustably secured to the bracket D' and limits the oscillatory movement of the target D. In the operation of the device this target swings upon its pivot through a limited arc, so that either one or other of the words thereon can project from behind the cover-plate, as shown in Figs. 2 and 8. The mechanism now to be described causes this target to swing upon its pivot, so as to make the proper indication.

The plate C has pivoted to it on a vertical axis a shoulder-plate E, having a shoulder $e$, adapted to engage with the pin $d$ or lower end on the target D. The spacer-rod $b$ has secured to it a radial ear B, to which is pivotally secured on a horizontal axis a space-plate F, which has a diagonally-disposed flange $f$, engaging with a similar flange $e'$ on the shoulder-plate E. Pivoted to the space-plate F upon a vertical axis is a shifter G, having a wedge-shaped lug $g$, adapted to engage with the pin d, as will hereinafter be set forth. The shoulder-plate E and the shifter G are connected at their free ends by a spring g', which tends to draw them together, and the movement of the plate G toward the plate E is limited by a pin f' on the space-plate. The space-plate F, shoulder-plate E, and shifter G extend through slots in a downwardly-extending flange c' on the plate C, which flange supports the free ends of said members.

It will be understood that in the operation of the machine the plate C always moves when a key is struck, while the space-rod b only moves when the space-key is struck. As a result the plate C and shoulder-plate E always move to the right when a key is struck, while the space-plate F and shifter G only move to the right when the space-key is struck. When a letter-key is struck and the plate C moves without movement of the space-rod b, the parts move to the positions illustrated in dotted lines in Fig. 4. If we assume that the indicator stood at "Space," the pin d would then be at the left-hand side of the slot c in the plate C and if the parts moved over the shoulder-plate would strike it, carrying it to the right under the wedge-shaped lug under the shifter G. This action would wedge the shifter up to the positions shown in dotted lines in Fig. 4, and as the pin moved on the spring would return the shifter to its normal position. When the plate C returned to its original position, the pin would be reached on the right side of the lug g, and the target would then be swung to the left with the word "Letter" visible. The next time a letter is struck the same movement of the parts will be repeated, except that as the pin is already at the right the shifter will not move, but only the shoulder-plate and plate C. If now a space be struck, the plate C and shoulder-plate will move exactly as before; but the space-plate F will move much farther and more rapidly by reason of the comparatively large ear on the space-rod b. As a result the space-plate will move to the right with respect to the shoulder-plate and swing said shoulder-plate downwardly to the position shown in Fig. 5, where it will completely clear the pin d. Simultaneously the shifter G will be moved far to the right, riding over the pin d, as illustrated in Fig. 5. When the space-key is released and the parts returned to their original position, the lug g will pull the pin d back with it to the left, causing the target to swing to the right, making the word "Space" visible.

I realize that considerable variation is possible in the details of this construction without departing from the spirit of my invention, and I do not intend, therefore, to limit myself to the specific form herein shown and described.

I claim as new and desire to secure by Letters Patent—

1. The combination with an escapement-operating member moved by character-keys and a space-rod moved by the space-key of a type-writer, of an indicating device, a device controlled by the escapement-operating member and constructed and arranged when operated alone to move the indicating device to one position, and a second device controlled by the space-rod and constructed and arranged when operated in conjunction with said first-named device to cause the indicating device to move to a second position.

2. The combination with an escapement-operating member moved by character-keys and a space-rod moved by the space-key of a type-writer, of an indicating device, a member moved by the escapement-operating device and having means of engagement with the indicating device to move it in one direction, and a device moved by the space-rod and arranged to throw said last-named member out of action, and simultaneously to engage said indicating device to move it to a second position.

3. The combination with an escapement-operating member moved by character-keys and a space-rod moved by the space-key of a type-writer, of an indicating device capable of occupying two positions, mechanism movable with the escapement-operating member and constructed and arranged to move said indicating device in one direction when operated, and a device movable by the space-rod and constructed and arranged to throw said mechanism out of action and itself to move the indicating device to a second position.

4. The combination with an escapement-operating member moved by character-keys and a space-rod moved by the space-key of a type-writer, of an indicating device, a member carried by the escapement-operating member, a shoulder-plate carried by said member and engaging with the indicating device to move it to one position, a space-plate carried by the space-rod and arranged to throw the shoulder-plate out of action, and a shifter carried by the space-plate and arranged to move the indicating device to a second position.

5. The combination with an escapement-operating member moved by character-keys and a space-rod moved by the space-key of a type-writer, of an indicating device, a member carried by the escapement-operating member, a shoulder-plate pivoted to said member, a space-plate movable by the space-rod, said space-plate and shoulder-plate having beveled engaging portions which operate to swing the shoulder-plate out of position to engage the indicating device when the space-plate is moved, a shifter pivoted to the space-plate, and having means of engagement with the indicating device.

6. The combination with an escapement-operating member moved by character-keys and a space-rod moved by the space-key of a type-writer, of an indicating device, a member carried by the escapement-operating member, a shoulder-plate carried by said member and engaging with the indicating device to move it to one position, a space-plate carried by the space-rod and arranged to throw the shoulder-plate out of action, a shifter carried by the space-plate and arranged to move the indicating device to a second position, and a spring connecting the ends of the shoulder-plate and the shifter.

In witness whereof I have signed the above application for Letters Patent, at Chicago, in the county of Cook and State of Illinois, this 4th day of October, A. D. 1905.

EMANUEL W. SWEIGARD.

Witnesses:
   CHAS. O. SHERVEY,
   K. M. CORNWALL.